(12) United States Patent
Kim

(10) Patent No.: US 10,632,800 B2
(45) Date of Patent: Apr. 28, 2020

(54) PARKING ASSISTANCE DEVICE USING TIRE PRESSURE MONITORING SYSTEM

(71) Applicant: MANDO CORPORATION, Pyeongtaek-si, Gyeonggi-do (KR)

(72) Inventor: Dong Ik Kim, Seongnam-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 243 days.

(21) Appl. No.: 15/486,817

(22) Filed: Apr. 13, 2017

(65) Prior Publication Data

US 2017/0297385 A1    Oct. 19, 2017

(30) Foreign Application Priority Data

Apr. 15, 2016  (KR) .......................... 10-2016-0046371

(51) Int. Cl.
| | |
|---|---|
| *B60C 23/02* | (2006.01) |
| *G01C 22/02* | (2006.01) |
| *G01C 21/26* | (2006.01) |
| *G01C 21/36* | (2006.01) |

(52) U.S. Cl.
CPC .............. *B60C 23/02* (2013.01); *G01C 21/26* (2013.01); *G01C 22/02* (2013.01); *G01C 21/3685* (2013.01)

(58) Field of Classification Search
CPC ........ B60C 23/02; G01C 21/26; G01C 22/02; G01C 21/3685
See application file for complete search history.

(56) References Cited

U.S. PATENT DOCUMENTS

| | | | |
|---|---|---|---|
| 6,684,691 B1 * | 2/2004 | Rosseau | B60C 23/061 340/442 |
| 2008/0133081 A1 * | 6/2008 | Colarelli | B60C 23/0408 701/29.2 |

(Continued)

FOREIGN PATENT DOCUMENTS

| | | |
|---|---|---|
| JP | 10-071818 A | 3/1998 |
| KR | 10-2008-0080331 A | 9/2008 |

(Continued)

OTHER PUBLICATIONS

Office Action Korean Patent Application No. 10-2016-0046371 dated Mar. 9, 2017.

*Primary Examiner* — Jelani A Smith
*Assistant Examiner* — Majdi Alsomiri
(74) *Attorney, Agent, or Firm* — Morgan, Lewis & Bockius LLP

(57) ABSTRACT

A parking assistance device includes: a sensor configured to search for a parking space around a vehicle; a tire pressure monitoring system configured to measure and monitor a tire pressure of the vehicle; and an electronic control unit configured to calculate a moving distance of the vehicle moving to the parking space according to the tire pressure, to estimate a position of the vehicle by using the calculated moving distance, and to generate a parking command. The moving distance of the vehicle is calculated by using a moving distance per revolution of a tire measured and is set according to a tire pressure range to which the tire pressure of the vehicle belongs, a wheel pulse of the tire of the vehicle, and a reference wheel pulse per revolution of the tire.

10 Claims, 3 Drawing Sheets

(56) References Cited

U.S. PATENT DOCUMENTS

| | | | | |
|---|---|---|---|---|
| 2009/0128315 A1* | 5/2009 | Griesser | ............... | B60C 23/061 |
| | | | | 340/443 |
| 2010/0259420 A1* | 10/2010 | Von Reyher | ......... | B62D 15/028 |
| | | | | 340/932.2 |
| 2012/0143456 A1* | 6/2012 | Ueda | .................... | B60W 10/08 |
| | | | | 701/93 |
| 2013/0081883 A1* | 4/2013 | Yang | .................. | B60C 23/0408 |
| | | | | 177/1 |
| 2016/0257303 A1* | 9/2016 | Lavoie | ................. | B60W 30/06 |
| 2018/0003593 A1* | 1/2018 | Siegel | ................... | B60C 11/246 |
| 2018/0178598 A1* | 6/2018 | Woodley | .............. | B60C 23/003 |

FOREIGN PATENT DOCUMENTS

| KR | 10-2010-0006714 A | 1/2010 |
|---|---|---|
| KR | 10-2012-0025170 A | 3/2012 |
| KR | 10-2012-0040789 A | 4/2012 |
| KR | 10-2013-0050681 A | 5/2013 |

* cited by examiner (a) EXCESSIVE TIRE PRESSURE (b) APPROPRIATE TIRE PRESSURE (c) INSUFFICIENT TIRE PRESSURE

PARKING ASSISTANCE DEVICE USING TIRE PRESSURE MONITORING SYSTEM

CROSS-REFERENCE(S) TO RELATED APPLICATION

This application claims the benefit of Korean Patent Application No. 10-2016-0046371, filed on Apr. 15, 2016, in the Korean Intellectual Property Office, the disclosure of which is incorporated herein in its entirety by reference.

BACKGROUND OF THE INVENTION

Field of the Invention

The present invention relates to a parking assistance device using a tire pressure monitoring system (TPMS), and more particularly, to a parking assistance device using a TPMS, which accurately calculates a moving distance of a vehicle by reflecting a tire pressure received from the TPMS and performs parking control in response to a parking command generated by using a parking route and a position of the vehicle estimated by the calculated moving distance of the vehicle, thereby improving automatic parking performance of the vehicle to a parking space.

Description of the Related Art

In general, a parking assistance device calculates a position of a vehicle and a distance value by using ultrasonic sensors installed on the front and rear sides of the vehicle and informs a driver of the position of the vehicle and the distance value by outputting a forward/reverse gear shift message.

Such parking assistance devices are disclosed in many patent applications (for example, Korean Patent Application Publication Nos. 10-2012-0040789 and 10-2012-0025170).

The existing parking assistance devices disclosed in, for example, Korean Patent Application Publication Nos. 10-2012-0040789 and 10-2012-0025170, may perform automatic steering control to prevent collision with an unexpected obstacle by identifying a position of an obstacle and allow a vehicle to be parked in a parking space by avoiding surrounding obstacles, thereby achieving safe vehicle parking.

However, even though parking control is performed on a vehicle with tires of a regulated tire size, a position of the vehicle calculated by an existing parking assistance device may be different from an actual position of a vehicle even in the same environment according to a tire pressure.

As illustrated in FIG. 1B, the existing parking assistance device measures a moving distance per revolution of a tire when air is pumped into a tire to an appropriate tire pressure, and sets the measured moving distance per resolution of the tire and a wheel pulse per revolution of the tire. Thus, when the tire pressure is insufficient as illustrated in FIG. 1C, or when the tire pressure is excessively high as illustrated in FIG. 1A, an actual position of the vehicle may be different from a position of the vehicle calculated by using a wheel pulse received from a wheel sensor, a set moving distance per revolution of a tire, and a set wheel pulse per revolution of a tire.

Therefore, there is a need for a parking assistance device, which can accurately calculate a moving distance of a vehicle by reflecting a tire pressure value and perform parking control in response to a parking command generated by using a parking route and a position of the vehicle estimated by the calculated moving distance of the vehicle, thereby improving parking performance.

PRIOR ART DOCUMENT

Patent Document (Patent Document 1) Korean Patent Application Publication No. 10-2012-0040789 (published on Apr. 30, 2012), entitled "PARKING ASSISTANCE METHOD AND SYSTEM THEREFORE"

(Patent Document 2) Korean Patent Application Publication No. 10-2012-0025170 (published on Mar. 15, 2012), entitled "PARKING CONTROL METHOD AND APPARATUS THEREFORE"

SUMMARY OF THE INVENTION

An aspect of the present invention is directed to provide a parking assistance device using a TPMS, which accurately calculates a moving distance of a vehicle by reflecting a tire pressure value received from the TPMS and performs parking control in response to a parking command generated by using a parking route and a position of the vehicle estimated by the calculated moving distance of the vehicle, thereby improving automatic parking performance of the vehicle to a parking space.

According to an embodiment of the present invention, a parking assistance device calculates a moving distance of a vehicle moving to a found parking space around the vehicle, estimates a position of the vehicle by using the calculated moving distance according to a tire pressure of the vehicle, and generates a parking command, wherein the moving distance of the vehicle is calculated by using a moving distance per revolution of a tire measured and set according to a tire pressure range to which the tire pressure of the vehicle belongs, a wheel pulse of the tire of the vehicle, and a reference wheel pulse per revolution of the tire.

The tire pressure range may be divided into a first pressure range that is lower than an appropriate pressure, a second pressure range that is within the appropriate pressure, and a third pressure range that is higher than the appropriate pressure.

The tire pressure range and the reference wheel pulse per revolution of the tire may be prestored values, and the wheel pulse of the tire of the vehicle may be a value measured through a wheel sensor installed in the vehicle.

The moving distance per revolution of the tire may be a value measured and set at a point where the tire turns one revolution by the wheel pulse measured through the wheel sensor according to the tire pressure range to which the tire pressure of the vehicle belongs.

The parking assistance device may release a parking assistance function when the tire pressure deviates a preset level or a tire pressure difference between front and rear wheels or between right and left wheels deviates a preset level.

DETAILED DESCRIPTION OF EMBODIMENTS

Hereinafter, preferred embodiments of the present invention will be described in detail with reference to the accompanying drawings.

Figure 1:
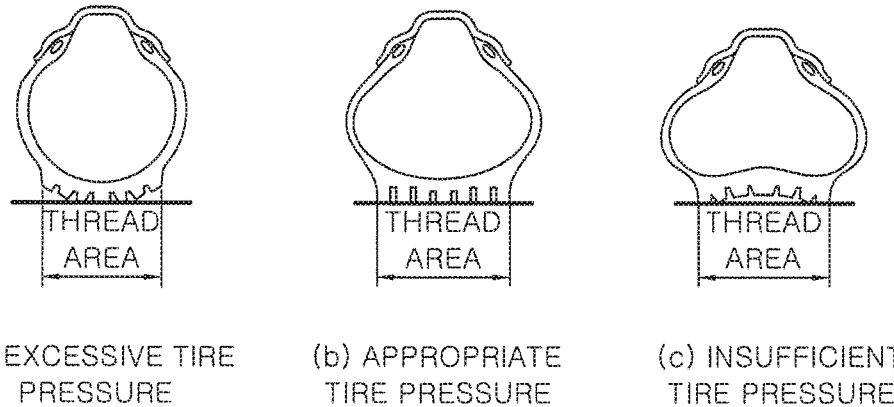
FIG. 1 illustrates three cases of a tire pressure level.
Figure 2:
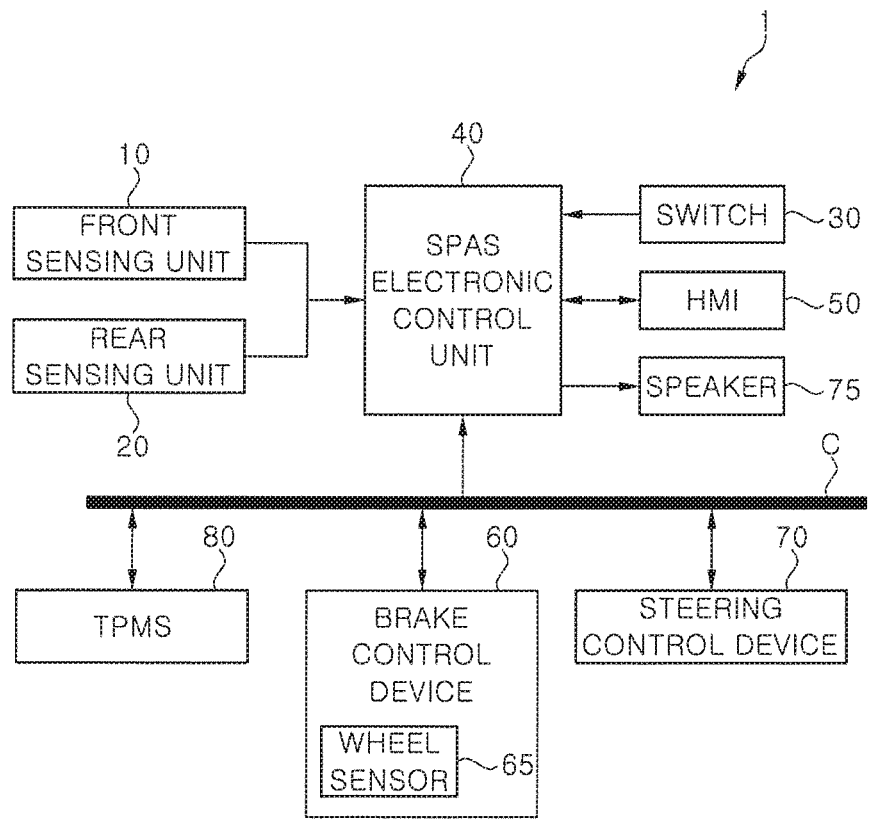
FIG. 2 is a block diagram of a parking assistance device using a TPMS according to an embodiment of the present invention.

FIG. 2 is a block diagram of a parking assistance device using a tire pressure monitoring system (TPMS) according to an embodiment of the present invention.

Referring to FIG. 2, the parking assistance device 1 according to the embodiment of the present invention is a device that assists parking of a vehicle. The parking assistance device 1 includes a front sensing unit 10 installed on a front side of a vehicle, a rear sensing unit 20 installed on a rear side of the vehicle, a smart parking assistance system (SPAS) electronic control unit 40 (hereinafter, simply referred to as an "electronic control unit") connected to the front sensing unit 10 and the rear sensing unit 20, a switch 30 configured to select automatic parking, a speaker 75 configured to output an alarm or notification information, and a brake control device 60 and a steering control device 70 configured to control a movement of the vehicle to perform automatic parking to a found parking space under control of the electronic control unit 40.

In addition, the parking assistance device according to the embodiment of the present invention may include a human-machine interface (HMI) 50 configured to display a parking state or vehicle condition information on a display device (not illustrated) under control of the electronic control unit 40.

In particular, the parking assistance device according to the embodiment of the present invention receives a tire pressure value from a TPMS 80 configured to measure and monitor a tire pressure value (pneumatic pressure), and receives a wheel pulse measured by a wheel sensor 65 of the brake control device 60.

The front sensing unit 10 and the rear sensing unit 20 may be ultrasonic sensors configured to receive echo ultrasonic signals reflected from an object located around the vehicle and measure a distance to the object. The electronic control unit 40 receives sensing signals sensed through the front sensing unit 10 and the rear sensing unit 20. Although it has been described that the ultrasonic sensors are used as the front sensing unit 10 and the rear sensing unit 20, a radar may also be used.

The front sensing unit 10 may be installed at each of a center and corners of the front side of the vehicle and may be provided in plurality. Similarly, the rear sensing unit 20 may be installed at each of a center and corners of the rear side of the vehicle and may be provided in plurality.

The electronic control unit 40 measures a position of the vehicle during automatic parking control, generates a parking route for parking to the found parking space with respect to the position of the vehicle, and controls the vehicle to move to the generated parking route.

More specifically, a tire pressure range for each section and a reference wheel pulse per revolution of the tire are set in the electronic control unit 40, the electronic control unit 40 receives the tire pressure to determine a tire pressure section to which the received tire pressure belongs, calculates a moving distance of the vehicle by using a reference wheel pulse per revolution of the tire, a wheel pulse measured by the wheel sensor 65, and a moving distance per revolution of the tire actually measured in the determined tire pressure section, and estimates the position of the vehicle moving to the parking space by using the calculated moving distance of the vehicle.

Figures 4, 5:
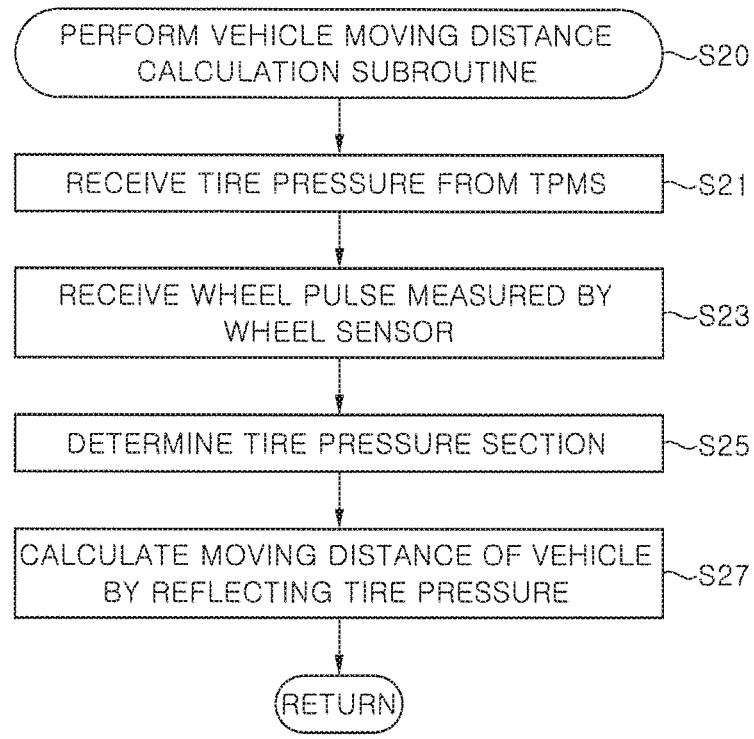
FIG. 4 is a flowchart of a vehicle moving distance calculation subroutine in FIG. 3.
FIG. 5 illustrates three cases of a tire pressure.

The moving distance of the vehicle is calculated by using Equation 1 below when the tire pressure received from the TPMS 80 belongs a low pressure section (first pressure section), is calculated by using Equation 2 below when the tire pressure belongs an appropriate pressure section (second pressure section), and is calculated by using Equation 3 below when the tire pressure belongs a high pressure section (third pressure section). As illustrated in FIG. 5, the sections are divided into a low pressure section, an appropriate section, and a high pressure section. A pressure (pneumatic pressure) range may be determined by tuning at the respective sections, that is, the low pressure section, the appropriate pressure section, and the high pressure section. For example, the low pressure section may be determined to be 25 psi to 29 psi, the appropriate pressure section may be determined to be 30 psi to 35 psi, and the high pressure section may be determined to be 36 psi to 40 psi.

$$MD_{case1}=WHLPUL(pul)*\beta_{case1}(cm/rev)/\alpha(pul/rev) \quad \text{[Equation 1]}$$

$$MD_{case2}=WHLPUL(pul)*\beta_{case2}(cm/rev)/\alpha(pul/rev) \quad \text{[Equation 2]}$$

$$MD_{case3}=WHLPUL(pul)*\beta_{case3}(cm/rev)/\alpha(pul/rev) \quad \text{[Equation 3]}$$

MD is the moving distance of the vehicle, $MD_{case1}$ is the moving distance of the vehicle when the tire pressure received from the TPMS 80 belongs to the first pressure section, $MD_{case2}$ is the moving distance of the vehicle when the tire pressure received from the TPMS 80 belongs to the second pressure section, $MD_{case3}$ is the moving distance of the vehicle when the tire pressure received from the TPMS 80 belongs to the third pressure section, WHLPUL corresponds to the wheel pulse measured by the wheel sensor 65, $\beta_{case1}$ is the moving distance per revolution of the tire measured and set to the first pressure section when the tire turns one revolution by the wheel pulse measured by the wheel sensor 65, $\beta_{case2}$ is the moving distance per revolution of the tire measured and set to the second pressure section when the tire turns one revolution by the wheel pulse measured by the wheel sensor 65, $\beta_{case3}$ is the moving distance per revolution of the tire measured and set to the second pressure section when the tire turns one revolution by the wheel pulse measured by the wheel sensor 65, and $\alpha$ is a reference wheel pulse per revolution of the tire.

In the present embodiment, although it has been described that the moving distance per revolution of the tire is set with respect to each section, the moving distance per revolution of the tire may be set with respect to each tire pressure. When the moving distance per revolution of the tire is set with respect to each tire pressure, the moving distance of the vehicle may be more accurately calculated.

In addition, the electronic control unit 40 calculates the position of the vehicle by using the moving distance of the vehicle calculated by taking into account the tire pressure, generates a parking command based on the calculated position of the vehicle and the parking route, and provides the generated parking command. When the parking command is a steering angle for the turning of the vehicle, the electronic control unit 40 applies the parking command to the steering control device 70. When the parking command is a brake signal for the braking of the vehicle, the electronic control unit 40 applies the parking command to the brake control device 60.

In this manner, it is possible to accurately calculate the moving distance of the vehicle moving to the parking space according to the tire pressure. Consequently, it is possible to generate the parking command according to the accurate position of the vehicle moving to the parking space, thereby improving automatic parking performance That is, it is possible to solve the problem that degrades the parking performance due to an error between the calculated moving distance of the vehicle and the actual moving distance of the vehicle when the tire pressure is not appropriate or when the tire pressure belongs a low pressure section or a high pressure section because the wheel pulse per revolution of the tire is set as the appropriate tire pressure.

However, the parking assistance device according to the embodiment of the present invention may release the automatic parking function when the tire pressure received from the TPMS 80 deviates the moving distance per revolution measured and set according to the tire pressure and the preset level to the extent that cannot compensate for the error between the calculated moving distance of the vehicle and the actual moving distance of the vehicle.

A parking assistance method of the parking assistance device using the TPMS will be described below with reference to FIG. 3.

Figure 3:
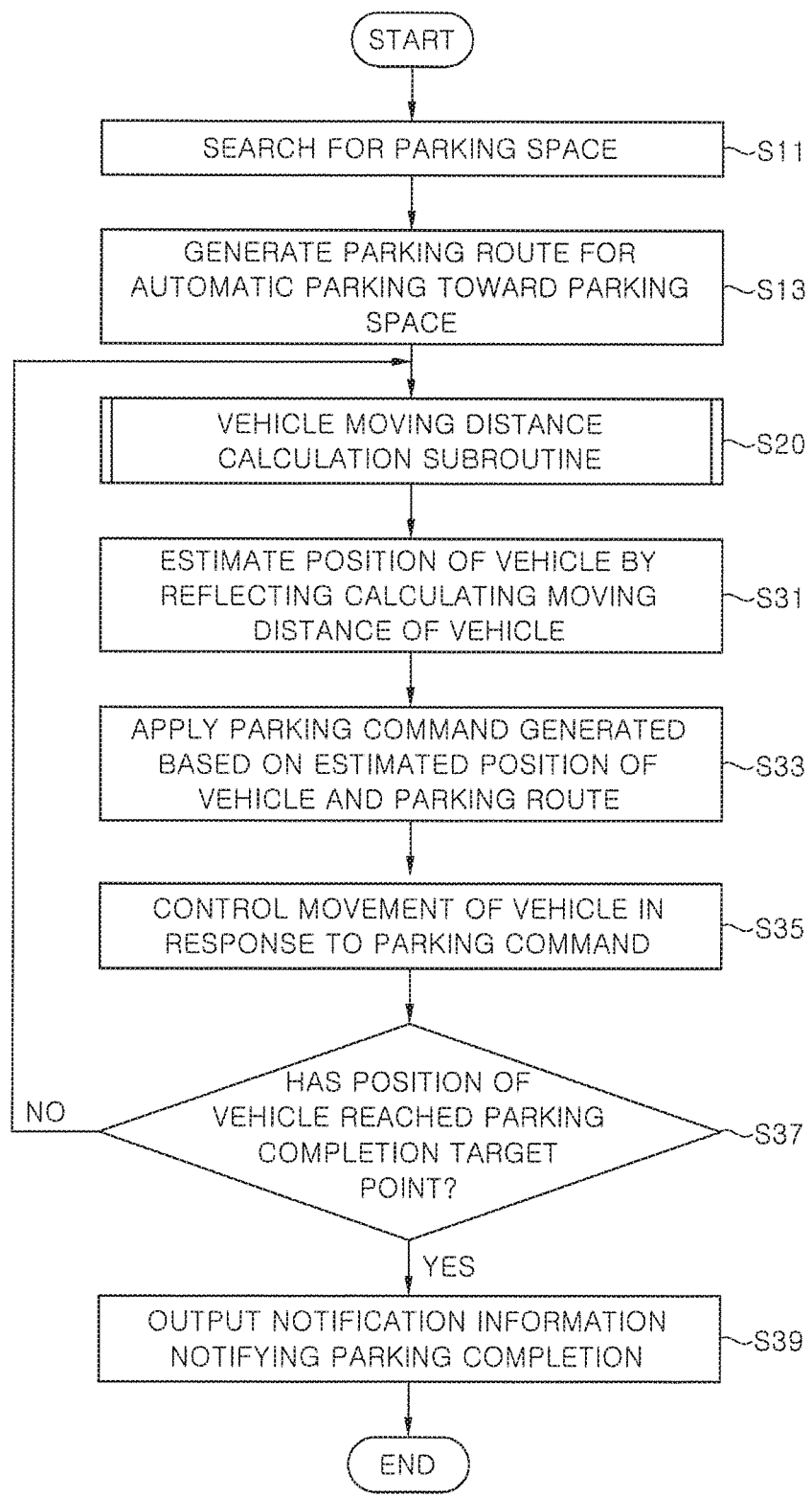
FIG. 3 is a flowchart of a parking assistance method of a parking assistance device using a TPMS according to an embodiment of the present invention.

FIG. 3 is a flowchart of the parking assistance method of the parking assistance device using the TPMS according to an embodiment of the present invention, and FIG. 4 is a flowchart of a vehicle moving distance calculation subroutine in FIG. 3.

Referring to FIG. 3, the electronic control unit 40 included in the parking assistance device 1 searches for a parking space through the front sensing unit 10 and the rear sensing unit 20 in response to an on signal of the switch 30 or an automatic parking request input from a driver (S11).

The electronic control unit 40 generates a parking route for automatic parking to the found parking space (S13).

Then, the electronic control unit 40 performs a vehicle moving distance calculation subroutine to calculate a moving distance of the vehicle moving along the generated parking route by reflecting a tire pressure (S20).

Referring to FIG. 4, the electronic control unit 40 stores, in a memory (not illustrated), a tire pressure range set with respect to each section, a reference wheel pulse per revolution of the tire, and a moving distance per revolution of the tire set with respect to each section.

Although the moving distance per revolution of the tire may be stored in the memory of the electronic control unit 40, data stored in the brake control device 60 may be received through a controller area network (CAN) C. The moving distance per revolution of the tire is a distance actually measured when the wheel pulse measured through the wheel sensor 65 when the tire pressure is appropriate is one revolution of the tire.

The electronic control unit 40 receives the tire pressure from the TPMS 80 through the CAN C (S21).

Also, the electronic control unit 40 receives the wheel pulse measured by the wheel sensor 65 through the CAN C (S23).

Operations S21 and S23 has only to be performed before operation S27 to be described below.

The electronic control unit 40 determines a tire pressure section to which the tire pressure belongs (S25). The tire pressure section is divided into a low pressure section, an appropriate pressure section, and a high pressure section.

The electronic control unit 40 calculates the moving distance of the vehicle, i.e., the moving distance of the vehicle to which the tire pressure is reflected, by using the reference wheel pulse per revolution of the tire, the moving distance per revolution of the tire set to the determined tire pressure section, and the wheel pulse received from the wheel sensor 65 (S27).

More specifically, when the determined tire pressure section is a low pressure section, the electronic control unit 40 calculates the moving distance of the vehicle by reflecting, to Equation 1, the reference wheel pulse per revolution of the tire, the moving distance per revolution of the tire set in advance by experience when the tire pressure is low, and the wheel pulse measured by the wheel sensor 65. When the determined tire pressure section is an appropriate pressure section, the electronic control unit 40 calculates the moving distance of the vehicle by reflecting, to Equation 2, the reference wheel pulse per revolution of the tire, the moving distance per revolution of the tire set in advance by experience when the tire pressure is appropriate, and the wheel pulse measured by the wheel sensor 65. When the determined tire pressure section is a high pressure section, the electronic control unit 40 calculates the moving distance of the vehicle by reflecting, to Equation 3, the reference wheel pulse per revolution of the tire, the moving distance per revolution of the tire set in advance by experience when the tire pressure is high, and the wheel pulse measured by the wheel sensor 65.

Returning to FIG. 3, the electronic control unit 40 estimates the position of the vehicle by reflecting the calculated moving distance of the vehicle (S31).

The electronic control unit 40 applies the parking command, which is generated based on the estimated position of the vehicle and the parking route, to either or both of the brake control device 60 and the steering control device (S33).

The electronic control unit 40 controls the movement of the vehicle in response to the parking command (S35).

Then, the electronic control unit 40 determines whether the position of the vehicle has reached a parking completion target point during the control of the movement of the vehicle (S37). The parking completion target point is determined when searching for the parking space.

When it is determined in operation S37 that the position of the vehicle has not reached the parking completion target point, the electronic control unit 40 proceeds to operation S20 to calculate the moving distance of the vehicle.

When it is determined in operation S37 that the position of the vehicle has reached the parking completion target point, the electronic control unit 40 outputs notification information to notify the parking completion (S39).

As described above, upon control of the movement of the vehicle to the parking space found during the automatic parking control, the position of the vehicle is estimated by using the moving distance of the vehicle calculated by reflecting the tire pressure and the parking command is applied. Thus, it is possible to reduce the error between the calculated moving distance of the vehicle and the actual moving distance of the vehicle, which occurs when the tire pressure is not appropriate, thereby improving parking performance.

According to the embodiments of the present invention, the moving distance of the vehicle is accurately calculated by reflecting the tire pressure value received from the TPMS, and the parking control is performed in response to the parking command generated by using the parking route and the position of the vehicle estimated by the calculated moving distance of the vehicle, thereby improving automatic parking performance of the vehicle to the parking space.

| DESCRIPTION OF REFERENCE NUMERALS | |
|---|---|
| 10: front sensing unit | 20: rear sensing unit |
| 30: switch | 40: electronic control unit |
| 50: HMI | 60: brake control device |
| 65: wheel sensor | 70: steering control device |
| 75: speaker | |

What is claimed is:

1. A parking assistance device comprising:
a sensor configured to search for a parking space around a vehicle;
a tire pressure monitoring system configured to measure a tire pressure of the vehicle; and
an electronic control unit configured to:
calculate a moving distance of the vehicle moving to the parking space according to the tire pressure;
estimate a position of the vehicle by using the calculated moving distance; and
generate a parking command,
wherein the moving distance of the vehicle is calculated by using a moving distance per revolution of a tire, and the moving distance of the vehicle is set according to a tire pressure range to which the tire pressure of the vehicle belongs, a wheel pulse of the tire of the vehicle, and a reference wheel pulse per revolution of the tire,
wherein the parking assistance device releases a parking assistance function when a tire pressure difference between a first wheel and a second wheel, which is different from the first wheel, deviates from a preset difference,
wherein the moving distance of the vehicle is the wheel pulse of the tire of the vehicle multiplied by the moving distance per revolution of the tire and divided by the reference wheel pulse per revolution of the tire,
wherein the wheel pulse of the tire of the vehicle is a value measured through a wheel sensor of the vehicle, and
wherein the moving distance per revolution of the tire is a value measured and set according to the tire pressure range.

2. The parking assistance device according to claim 1, wherein the tire pressure range is divided into a first pressure range that is lower than an appropriate pressure, a second pressure range that is within the appropriate pressure, and a third pressure range that is higher than the appropriate pressure.

3. The parking assistance device according to claim 2, wherein the parking assistance device releases the parking assistance function when the tire pressure deviates from a preset level.

4. The parking assistance device according to claim 1, wherein the tire pressure range includes prestored values.

5. The parking assistance device according to claim 4, wherein the moving distance per revolution of the tire is set at a point where the tire turns one revolution by the wheel pulse measured through the wheel sensor according to the tire pressure range to which the tire pressure of the vehicle belongs.

6. The parking assistance device according to claim 5, wherein the parking assistance device releases the parking assistance function when the tire pressure deviates from a preset level.

7. The parking assistance device according to claim 4, wherein the parking assistance device releases the parking assistance function when the tire pressure deviates from a preset level.

8. The parking assistance device according to claim 1, wherein the parking assistance device releases the parking assistance function when the tire pressure deviates from a preset level.

9. The parking assistance device according to claim 1, wherein the first wheel includes a front wheel and the second wheel includes a rear wheel.

10. The parking assistance device according to claim 1, wherein the first wheel includes a right wheel and the second wheel includes a left wheel.

* * * * *